United States Patent [19]
Reed et al.

[11] Patent Number: 5,371,901
[45] Date of Patent: Dec. 6, 1994

[54] REMOTE VOICE CONTROL SYSTEM

[75] Inventors: John D. Reed, Arlington; R. Mark Harrison, Grapevine; Walter J. Rozanski, Jr., Hurst, all of Tex.

[73] Assignee: Motorola, Inc., Schaumburg, Ill.

[21] Appl. No.: 207,242

[22] Filed: Mar. 4, 1994

Related U.S. Application Data

[63] Continuation of Ser. No. 727,030, Jul. 8, 1991, abandoned.

[51] Int. Cl.⁵ .................................................. H04B 1/38
[52] U.S. Cl. ........................................ 455/69; 455/88; 455/89; 455/353; 455/11.1; 381/42
[58] Field of Search ............... 455/11.1, 66, 69, 79, 455/88-89, 92, 352, 353; 381/36, 38, 42, 43; 395/2; 379/88

[56]  References Cited

U.S. PATENT DOCUMENTS

| | | | |
|---|---|---|---|
| 3,745,462 | 7/1973 | Trimble | 455/11.1 |
| 4,056,779 | 11/1977 | Toler | 455/11.1 |
| 4,426,733 | 1/1984 | Brenig | 455/79 |
| 4,462,080 | 7/1984 | Johnstone et al. | 381/110 |
| 4,525,793 | 6/1985 | Stackhouse | 395/2 |
| 4,539,706 | 9/1985 | Mears et al. | 455/11.1 |
| 4,680,797 | 7/1987 | Benke | 381/36 |
| 4,882,681 | 11/1989 | Brotz | 340/825.76 |
| 5,020,107 | 5/1991 | Rohani et al. | 381/43 |
| 5,109,526 | 4/1992 | Reed | 455/11.1 |
| 5,146,538 | 9/1992 | Sobti et al. | 379/88 |
| 5,166,971 | 11/1992 | Vollert | 379/88 |

FOREIGN PATENT DOCUMENTS 0187847  8/1988  Japan ................................. 379/58

Primary Examiner—Reinhard J. Eisenzopf
Assistant Examiner—Andrew Faile
Attorney, Agent, or Firm—Robert S. Babayi; Michael J. Buchenhorner; Pedro P. Hernandez

[57]  ABSTRACT

A portable communication device (10) is controlled by voice recognition circuitry (20) remote from the portable communication device. The portable communication device includes apparatus for producing and transmitting a parametric representation of voice commands. The remote circuitry (which could possibly be a base station, a mobile repeater, or simply a dedicated box, separate from the portable) produces control signals, responsive to the parametric representation of voice commands, for controlling the portable communication device.

10 Claims, 4 Drawing Sheets

REMOTE VOICE CONTROL SYSTEM

This is a continuation of application Ser. No. 07/727,030, filed on Jul. 8, 1991 and now abandoned.

TECHNICAL FIELD

This invention relates generally to radio communication systems, and more specifically, to radio communications systems using digital signal processing (DSP) and voice control.

BACKGROUND

As portable radios decrease in size, and increase in the number of available options, it becomes more difficult to supply sufficient keyboard and display functions due to size, cost, complexity, and current drain. An alternate method that could use a smaller keypad, but still control and increasing number of options would thus be desirable. A voice recognition system could accomplish this control with a minimal keypad, but it would require complicated digital signal processing circuitry that is expensive, and consumes significant amounts of current, both highly undesirable in a portable radio. Accordingly, a need exists for a voice-controlled portable radio that avoids the detriments of the prior art.

SUMMARY OF THE INVENTION

Briefly, in accordance with the invention, a portable communication device is controlled by voice recognition circuitry remote from the portable communication device. The portable communication device includes means for transmitting a signal representing voice commands. The remote circuitry produces control signals, responsive to the signal representing voice commands, for controlling the portable communication device. Thus, a voice-operated portable communication device is provided that overcomes the detriments of the prior art.

DETAILED DESCRIPTION OF THE PREFERRED EMBODIMENTS

Figure 1:
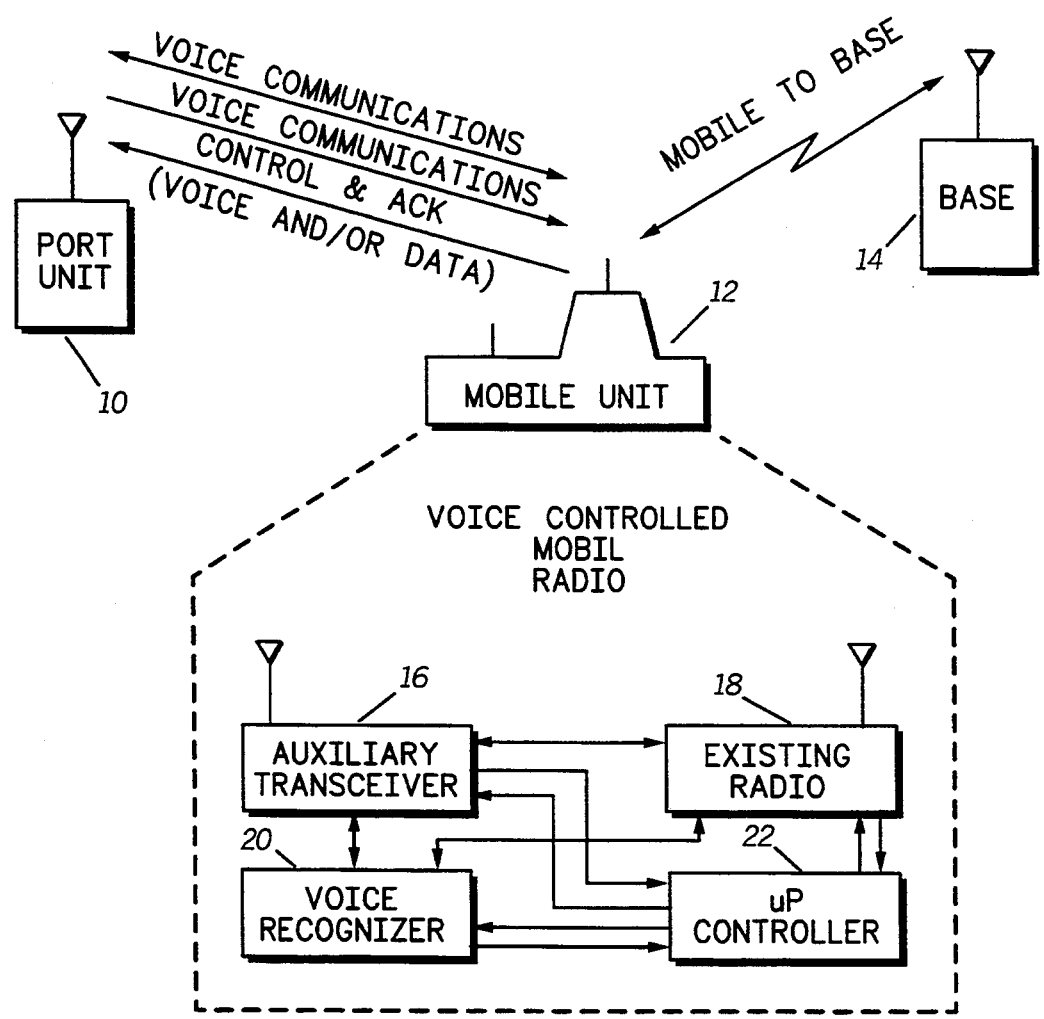
FIG. 1 is a block diagram of a vehicular repeater system in accordance with the invention.

Referring to FIG. 1, there is shown a vehicular repeater system in accordance with a preferred embodiment of the invention. The system comprises a portable radio 10, a voice-controlled mobile repeater unit 12 and a base 14. In this embodiment, the voice recognition circuitry is in a voice recognizer 20 located in the mobile repeater unit 12. The mobile repeater unit also comprises a mobile radio transceiver 18, an auxiliary transceiver 16, and a microprocessor controller 22. Signals are transmitted by the portable radio 10, received by the vehicular repeater unit 12, and repeated to the base station 14.

Access to the voice recognizer 20 is accomplished over the normal transmission of the portable 10. In accordance with the invention, a user of the portable 10 utters voice commands and the portable transmits a representation of the voice commands, i.e., voice-modulated or digitally coded voice signals. If the portable 10 uses a digital vocoder, the parametric representation is the digitally-coded speech. Speech coding parameters are well-known in the art, examples of which are found in L. R. Rabiner and R. W. Schafer, Digital Processing of Speech Signals, Prentice-Hall, 1978, at Chapters 6–8. Digitally coded speech often uses linear predictive coding (LPC) parameters, which are also used in speech recognition. See L. R. Rabiner and S. E. Levinson, "Isolated and Connected Word Recognition—Theory and Selected Applications," IEEE Transactions On Communications, Vol. Com.-29, May 1981, at pp. 621–659. Therefore, a recognizer receiving digitally coded speech does not extract features, but can obtain them directly from the encoded speech.

A radio-frequency (RF) link is preferred for sending the commands and data back and forth from the mobile unit 12 to the portable 10. Thus, the parametric representation of commands that are given in a voice message from the user of the portable unit 10 will be received by the mobile repeater unit 12 and "recognized" as command words. The mobile repeater unit 12 then interprets the command and sends an acknowledgement of the command and a data/control message back to the portable 10, in response to the voice command.

In the vehicular repeater system, the voice recognizer 20 would accept speech input from two sources: a microphone in the vehicle and from the portable (through the repeater's auxiliary transceiver 16). Thus, the portable radio user can control the mobile radio transceiver 18 while in the vehicle (i.e., using the microphone), or through the portable 10, while outside of the vehicle. The state of the mobile repeater unit 12 could be sent to the portable 10 with synthesized voice and subaudible signalling, or a data packet could be sent to update or control the portable 10. When the portable 10 talks to the mobile repeater unit 12, different subaudible signals could differentiate the voice commands from normal conversation.

Figure 2:
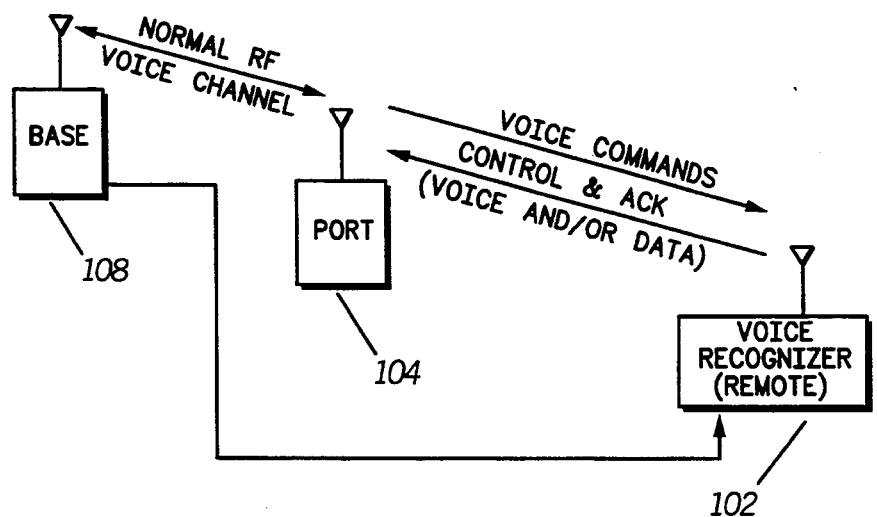
FIG. 2 is a block diagram of another communication system in accordance with the invention.

Referring to FIG. 2, the portable radio 104 operates as a talk/listen radio to the base 108, and includes added capabilities for exchanging data, voice and control signals with the voice recognizer 102. A remote portable 104 sends voice to the base 108 and voice commands to the recognizer 102. A connection using any of several communication media such as RF, fiber optic, or hardwired connection may be made between the base 108 and remote recognizer 102. Thus, if desired, information may be transferred between the base 108 and the recognizer 102. Different subaudible signals could differentiate the voice commands from normal conversation. The voice recognizer 102 determines the voice commands given through the portable 104, and sends back the necessary control signals to effect the control in the portable 104. Through this pairing, voice control of the portable 104 (or any unit connected to the recognizer or portable) is possible without the need of voice control circuitry in the portable 104 itself, requiring almost no additional complexity in the portable 104, A simple microprocessor in the portable 104 would be able to decode data packets, and execute the required control functions. Several portables could be serviced by a single remote recognizer.

Figure 3:
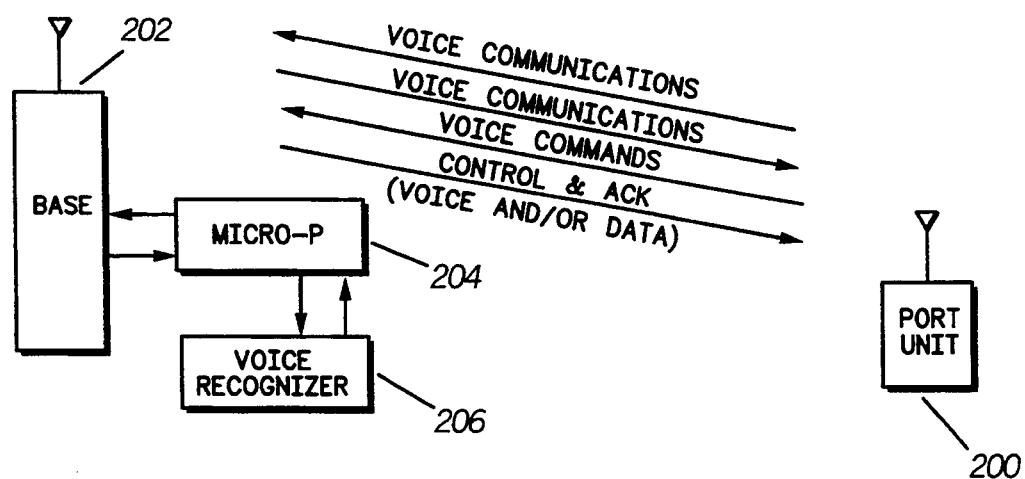
FIG. 3 is a block diagram of a further communication system in accordance with the invention.

Referring to FIG. 3, in a third possible embodiment, a voice recognizer 206 is coupled to a base station 202 via a microprocessor 204. In this embodiment, both the base 202 and the portable 200 can be remotely controlled by voice commands. The same control/data packets will be required from the base 202 as were required from the remote voice recognizer 102 in the previous embodiment. However, if the status of the base 202 is altered, some additional acknowledgements/data may be needed to inform the user of the change.

A further benefit obtained by placing the voice recognizer 102 in or near the base 202 is that the voice recognizer 206 can now be shared by multiple remote units over the entire coverage range of the base station 202. If the incoming voice commands are coded with the identity of the sender, then control sequences can be sent back to that individual sender. Thus, the recognition circuitry can be used at maximal efficiency. Fleet management functions could also provide control for a pre-defined group or fleet of portables.

Figure 4:
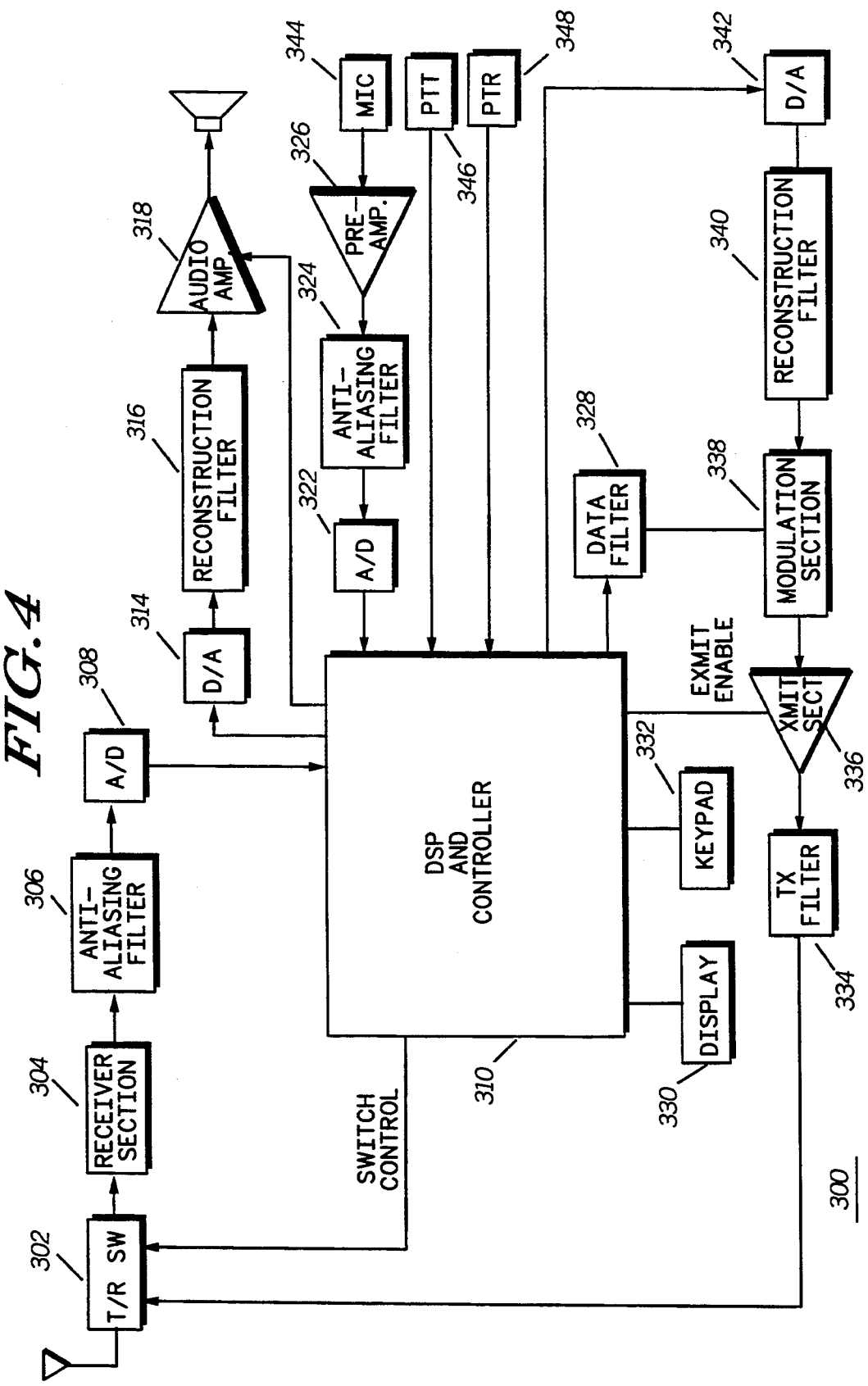
FIG. 4 is a block diagram of a portable radio communication device in accordance with the invention.

Referring to FIG. 4, there is shown a block diagram of a portable radio communication device 300, in accordance with the invention. When the portable radio communication device 300 is in the receive mode, the transmit/receive switch 302 connects the antenna to a receiver section 304 which converts the received RF signals to either intermediate frequency (IF) or audio frequency signals. The output of the receiver section 304 is provided to an anti-aliasing filter 306 for filtering out of frequencies outside the desired sampling range. An analog-to-digital converter 308 converts the analog output of the anti-aliasing filter 306 to a digital signal suitable for processing by a digital signal processor (DSP)/controller 310. The DSP/controller 310 performs the desired processing of the received signals. The received signals may include both a data component and a non-data component (e.g., conversation). In the event that the data portion includes control signals, the appropriate control signals are are decoded and implemented in the portable 10. The non-command information received is presented to the user of the portable by converting the processed signal to analog form with a digital-to-analog converter 314. The signal is filtered (316) to remove undesired components, and amplified (318) and converted to sound by the speaker.

There are two sub-modes in the transmit mode: a first sub-mode is triggered by activating a push-to-talk (PTT) switch 346, and the second mode is triggered by activating a push-to-recognize (PTR) switch 348. The two user-activated switches 346 and 348 are coupled to the DSP/controller 310 to place the portable 300 in the desired mode. The second mode is a voice recognition mode that can be added to a portable to enhance voice recognition operation. The second mode can also (alternatively) be activated remotely using control of the voice recognition unit by providing for continuous recognition of the signals transmitted by the portable, to trigger the voice command recognition mode.

In the voice command recognition mode (or PTR) mode, the portable is in a mode whereby the DSP and controller 310 "knows" that it is receiving voice commands, and accordingly may use a faster sampling rate so that additional processing may be done on the voice command signals. Since the controller knows that a command word is being uttered, it may implement a different sampling rate to obtain voice samples and perhaps a different coding scheme to transmit the command word to the base. This coding scheme need not require transmission of the command words in "real time." By processing the command words differently than regular speech, the fidelity of the utterance can be preserved, thus producing a better recognition decision. The use of the push-to-recognize switch 348 also eliminates the need for the speech recognition apparatus to identify command signals.

In the PTT mode, the portable receives voice from the microphone 344 for voice conversation as in a normal push to talk radio. The voice is amplified by a preamplifier 326 and applied to an anti-aliasing filter 324. The filtered output of the anti-aliasing filter 324 is applied to an A/D converter 322, and the resulting digital signal is applied to the DSP/Controller 310 for processing. The DSP/Controller 310 applies the processed signals to a D/A converter 342 for conversion to analog form. The output of the D/A converter 342 is applied to a reconstruction filter 340 for removing artifacts (e.g., transients) resulting from the D/A conversion. The resulting signal is applied to a modulation section 338. The modulated signal is amplified by a power amplifier 336, and filtered by filter 334 before transmission.

The DSP/controller 310 may be a known DSP integrated circuit alone or combined with a conventional microprocessor, controlled by software to extract speech recognition features from the sampled speech. In the PTR mode, the DSP and controller 310 produces a parametric representation of the voice commands (e.g., by extracting speech recognition features from the speech received from the user of the portable 10) from the microphone 344. The parametric representation of the voice commands is then applied to a modulator 338 through a data filter 328. The modulator 338 could use any form of modulation (e.g., A.M., F.M., or quadrature AM modulation, i.e., QAM). The resulting modulated signal is applied to the power amplifier 336 for amplification to a level suitable for over-the-air transmission. The resulting amplified signal is filtered at a transmit filter for removal of undesired harmonics from the RF signal to be transmitted.

The PTR switch could enable the addition of tone coded squelch or digital coded squelch signals to the modulation section 338 via the data filter 328 to both identify and differentiate the two transmit modes. In this way, the receiving unit would know when to repeat the voice message or when to look for a voice command. The PTT and the PTR would use different tones or codes to differentiate between them.

The addition of the second transmit mode is an improvement to the basic idea. This would add three important improvements to the communication systems shown in the previous figures.

First, it would limit the recognizer to verbal inputs that were strictly commands. This way, normal verbal messages used in communication to other people would not cause an improper response from the recognizer if it happened to sound similar to a voice command. In fact, the portable could be simplified from those of today while providing new enhanced features.

Second, the voice commands that were give to control the unit would not be broadcast to others listening to the radio system.

Third, the voice commands could be processed differently, in the portable and at the base, from normal conversation to improve the remote recognition accuracy.

In the case of the Mobile Repeater, the recognizer built into the mobile radio would normally be used to control the mobile when the user was in the car. Since the car and the mobile microphone have certain acoustical properties, the recognizer will be designed for this case. Now when the portable is used outside the car to operate the mobile radio, the activation of the PTR switch during the issuance of verbal commands will allow the mobile recognizer to adjust various parameters of the voice recognition system to enhance the recognition of the detected RF signal containing the voice of the remote user. This allows the frequency response of the portable to be taken into account in the recognition process.

Adding a Voice Synthesizer to the remote recognizer unit will allow the acknowledgements to voice commands to be made verbally. In this way the user could request a status of what channel is being used or receive a verbal acknowledgement to channel changes etc. In this approach, a display may not be needed.

The portable could be used for the repeater case as a wireless control head while inside the car. In this case it would be desirable to avoid transmitting inside the vehicle and perhaps overdriving the nearby receiver. Further, if considered that there would only be a limited number of frequencies for the portable to mobile link, it would seem to be undesirable to have people inside cars using up these links. By using an Infra-Red channel, the battery could be saved from the normal current drain of the portable transmitter if the infra-red transmit power is lower than the RF transmit power. If the IR link between the portable and the mobile interface were to fail, the RF transmission could be resumed. If desired, an ultra-sonic link could be used as an added method of communication between the portable and the mobile unit inside the car.

Figure 5:
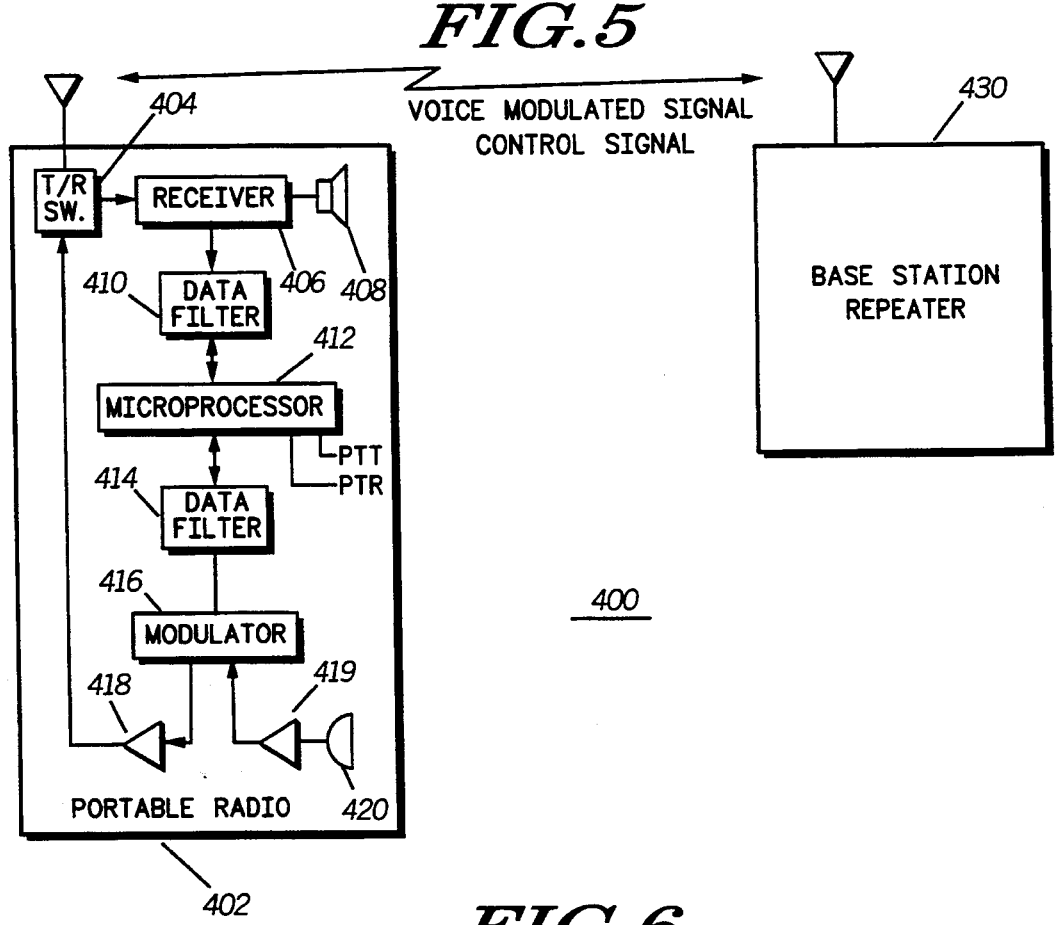
FIG. 5 is a functional block diagram of a communication system in accordance with the invention.

Referring to FIG. 5, there is shown a functional block diagram of a simplified communication system 400 in accordance with of the invention. A portable radio 402 is similar to portable radio 300 but simplified in that there are no DSP or A/D converters. A base station repeater 430 includes the remote voice recognition circuitry in accordance with the invention. Basically, the portable radio 402 receives voice commands from the user and transmits RF signals modulated with the voice signals. The base station repeater 430 receives the voice modulated signals and transmits control signals back to the portable 402.

The portable 402 can affect control of the base unit 430 to recognize voice commands preferably by sending the proper low speed coded squelch tone or digital word, or other subaudible signal, transmitted continuously with the voice commands. Alternatively, a high speed data packet could be sent, causing the base 430 to enter the voice-recognition mode for a predetermined time interval or until the proper low speed coded squelch tone, digital squelch word, or another data packet is received by the base 430. Moreover, the control signals can be low speed data, or high speed data packets or a combination.

When the portable 402 is in the receive mode, it receives from the base, voice-modulated signals and control signals. When the PTR switch is activated voice commands received at the microphone 420 are amplified (419) and applied to a modulator 416. The microprocessor 412 may add low speed data modulation to the signal being modulated.

Figure 6:
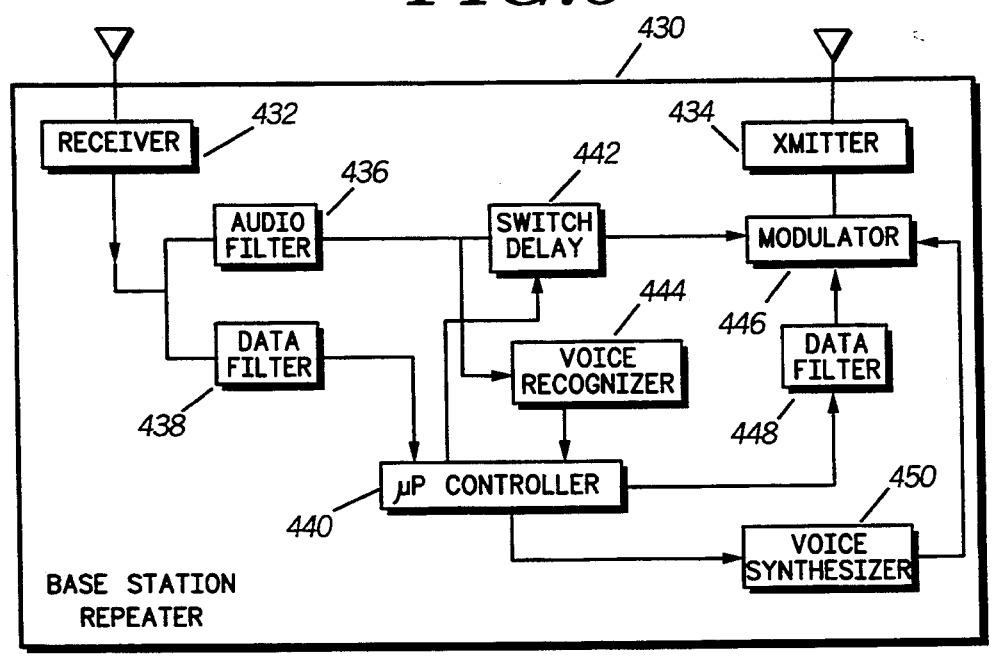
FIG. 6 is block diagram of a base station repeater in accordance with the invention.

Referring to FIG. 6, there is shown a block diagram of a base station repeater 430 in accordance with of the invention. The base station includes a receiver 432, which receives signals to be repeated by a transmitter 434. The receiver 432 provides an audio signal representative of the the received signal to an audio filter 436 which conditions the audio signal for processing by a voice recognizer 444. A delay/switch block 442 is under the control of the microprocessor controller 440, and when enabled, causes the audio information to pass from the audio filter 436 to the transmit modulator 446. Thus, the audio is repeated by the transmitter. If two switches, i.e., a PTT and PTR switch, are used to differentiate the two different modes, a delay is not needed, and block 442 only serves to mute and unmute the transmit audio. If there is no PTR switch (for a given implementation) on the portable, and only key words are used to differentiate the modes, then a delay would be desirable in addition to the switch function in block 442.

The delay/switch block 442 could be used to delay the radio signal while it is analyzed for "key words" by the voice recognizer 444. The delay/switch block 442 breaks the path of the audio, thereby muting the key word and following command words from being repeated. This muting process remains in effect for a predetermined time, or until the input signal is lost, another key word ends the voice commands, or by data signalling from the portable unit, or by control of the microprocessor controller 440.

The switch/delay block 442 could work in several ways. First, a constant delay could be used all the time. However, such delay would be undesirable to users. Second, if key words are only given in the beginning of a transmission, the delay can start at a given value and then be gradually reduced after the first few seconds. This reduction would reduce the delay to zero or near zero. Third, there can be no delay at all. In this method, the key word would be heard by other users of the communication system, but the following words would be muted.

The data filter 438 prepares the received data to be sampled by the microprocessor controller 440. This data could be sub audible tone encoded or digitally encoded squelch words, different codes or tones being used for the purposes of indicating the mode of the portable (i.e., PTT mode or PTR mode) or for high speed data packets used for receiving data and control packets.

The delay is not required in delay/switch block 442 when a switch is used to manually enter the PTR mode.

The microprocessor controller 440 can also send data to the portable by passing signals through the data filter 448 prior to being applied to the modulator 446. Both low speed and high speed data could be sent via this path.

The microprocessor controller 440 can also respond to commands of the portable or to give update messages by activating a voice synthesizer 450 which generates an audio "voice" signal which is applied to the modulator 446. A data filter 438 filters the audio output of the receiver 432 for processing by a microprocessor controller 440.

Thus, there is provided a voice-controlled portable radio that avoids the detriments of the prior art by using speech recognition apparatus at a remote location to provide the controlling signals to the portable radio, over a communication medium.

What is claimed is:

1. In a communication system including a voice recognition means for recognizing voice commands and providing control signals in response thereto, a portable radio remote from the voice recognition means, the portable radio including adjustable controls, the portable radio comprising:

transmitter means for transmitting a representation of the voice commands to the voice recognition means, the voice commands informing the voice recognition means which of the adjustable controls in the portable radio to adjust;

receiver means for receiving said control signals from the voice recognition means; and controller means for adjusting at least one of the adjustable controls of the portable radio in response to the control signals received by the receiver means, whereby control signals received from the voice recognition means control operation of the portable radio which transmitted the representation of the voice commands.

2. The portable radio of claim 1, wherein the representation of the voice commands is parametric.

3. The portable radio of claim 1, wherein the representation of the voice commands comprises recognition features of the voice commands.

4. The portable radio of claim 1, further comprising:

first means for placing the portable radio in a conventional transmit mode when the first means is activated; and second means for placing the portable radio in a voice command transmit mode when the second means is activated.

5. The portable radio of claim 4, wherein the second means comprises a switch.

6. The portable radio of claim 4, wherein the second means is responsive to voice commands.

7. A communication system comprising:

voice recognition means for recognizing voice commands, and for providing control signals responsive to the voice commands; and a portable radio remote from the voice recognition means, the portable radio including adjustable controls, comprising:

transmitter means for transmitting a representation of the voice commands to the voice recognition means, the voice commands informing the voice recognition means which of the adjustable controls in the portable radio to adjust;

receiver means for receiving said control signals from the voice recognition means;

controller means for adjusting at least one of the adjustable controls in the portable radio in response to the control signals received by the receiver means, whereby control signals received from the voice recognition means control operation of the portable radio which transmitted the representation of the voice commands.

8. The communication system of claim 7, further comprising a vehicular repeater comprising the voice recognition means.

9. The communication system of claim 8, further comprising a base station for communicating messages between the portable radio and the vehicular repeater.

10. The communication system of claim 7, further comprising a radio comprising the voice recognition means.

* * * * *